United States Patent Office 3,147,298
Patented Sept. 1, 1964

1

3,147,298
TRANSESTERIFICATION OF ARYL SUBSTITUTED PHOSPHITES WITH ALIPHATIC MERCAPTANS
Ingenuin Hechenbleikner, Cincinnati, Ohio, assignor to Hooker Chemical Corporation, Niagara Falls, N.Y., a corporation of New York
No Drawing. Filed Dec. 5, 1960, Ser. No. 73,544
12 Claims. (Cl. 260—461)

This invention relates to the transesterification of aryl-substituted hydrogen phosphites with aliphatic mercaptans to form thiohydrogenphosphites.

Organic thiohydrogenphosphites have been used extensively as chemical intermediates, as additives for hypergolic fuels, as stabilizers for polyolefines, as additives for lubricants, as cotton defoliants and for numerous other purposes.

It is an object of this invention to provide an improved and more economical method of preparing organo thiohydrogenphosphites.

Another object of the invention is to provide an improved and more economical method of preparing aryl-alkylmonothiohydrogenphosphites.

Still a further object of the invention is to provide an improved and more economical method of preparing dialkyldithiohydrogenphosphites.

A further object of the invention is to provide an improved and more economical method for preparing di-lauryldithiohydrogenphosphite.

Still another object of the invention is to provide a method of producing organothiohydrogenphosphites in improved yield and purity.

These and other objects of the invention will be apparent from the following detailed description.

It has now been discovered that one or more aryl groups can be eliminated from an aryl-substituted hydrogen phosphite selected from the group consisting of diaryl hydrogen phosphites, arylalkyl hydrogen phosphites, and O-arylalkylmonothiohydrogen phosphites, by transesterification with an aliphatic mercaptan to form thiohydrogenphosphites containing at least one more thiophosphite linkage than the starting material. Halogen-substituted, alkyl-substituted hydrogen phosphites and thiohydrogen phosphites may also be employed.

Typical examples of suitable diaryl hydrogen phosphites than can be employed are diphenyl hydrogen phosphite, dicresyl hydrogen phosphite, bis(2,4-xylyl) hydrogen phosphite, phenylcresyl hydrogen phosphite, and cresylchlorophenyl hydrogen phosphite. Suitable di(alkylaryl) hydrogen phosphites include bis(butylphenyl) hydrogen phosphite and bis(nonylphenyl) hydrogen phosphite. Suitable halogenated diaryl hydrogen phosphites include bis(trichlorophenyl) hydrogen phosphite, bis(trichlorocresyl) hydrogen phosphite, and the corresponding bromine-, iodine-, and fluorine-containing compounds. Halogenated aryl-substituted hydrogen phosphites containing more or less than three atoms of halogen per aryl group can also be employed. Aryl-substituted alkylthiohydrogen phosphites such as O-phenylbutyl monothiohydrogen phosphite, O-cresylallylmonothiohydrogen phosphite and the like may also be employed.

Any primary or secondary aliphatic mercaptan or mixtures thereof may be employed as a reactant. Suitable primary alkyl mercaptans include methyl, ethyl, butyl, propyl, amyl, hexyl, octyl, nonyl, decyl, lauryl, cetyl, octadecyl, stearyl, benzyl mercaptans or mixtures thereof. Suitable dithiols include ethanedithiol, propane-1,2-dithiol, butylene-2,3-dithiol, propane-1,3-dithiol, hexane-1,6-dithiol and mixtures thereof. Typical examples of aryl-substituted-alkyl mercaptans and heterocylic mercaptans include para-nitrobenzyl mercaptan, phenylethyl mercaptan and furfuryl mercaptan. Suitable alkenyl mercaptans include allyl mercaptan, methallyl mercaptan, crotyl mercaptan (1-butene-4-thiol), and mixtures thereof.

Although a catalyst is not always essential in obtaining a satisfactory yield, it is desirable in some instances to admix a basic catalyst with the aryl hydrogen phosphite and the aliphatic mercaptan reactants prior to and/or during the reaction. Suitable basic catalysts include the alkali metals, alkali metal hydrides, alkali metal sulfides and mixtures thereof. For example, sodium, potassium, lithium, sodium hydride, potassium hydride, lithium hydride, sodium sulfide, potassium sulfide, lithium sulfide and mixtures thereof may be employed as the basic catalyst. The basic catalyst may be added in a catalytic proportion, for example, between about 0.05 and about 5.0, and preferably between about 0.1 and about 1.5 percent by weight of the diaryl hydrogen phosphite. However, lesser or greater proportions may be employed if desired. It has been found that when the transesterification reaction is carried out in the presence of a basic catalyst, the reaction rate is increased, the product yield is increased, and the proportion of impurities in the product is markedly reduced.

Any convenient order of mixing of the reactants with the catalyst may be employed. For example, in one modification the basic catalyst is admixed with the aliphatic mercaptan and the resulting mixture is then added to the diaryl hydrogen phosphite. In another modification, a mixture of diaryl hydrogen phosphite and basic catalyst is prepared and then added to the alphatic mercaptan. If desired, the two reactants and the basic catalyst may be added simultaneously to the reaction zone.

The product obtained in the instant novel transesterification reaction depends on the type of reactants and the proportions of reactants. Typical transesterification reactions within the scope of this invention are illustrated by the following equations:

(1)

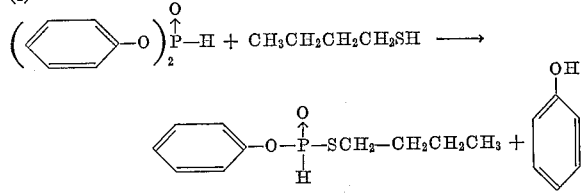

(2)

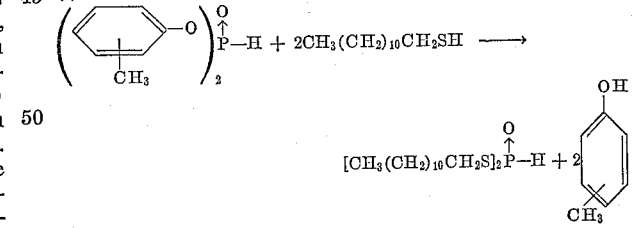

(3)

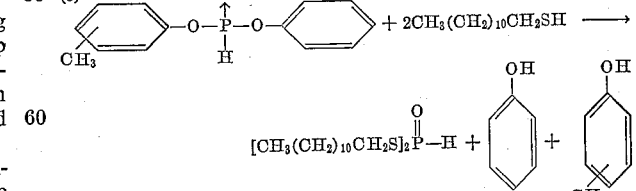

(4)

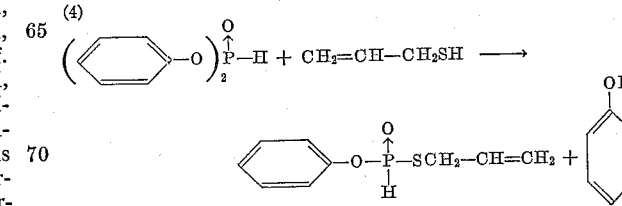

(5) 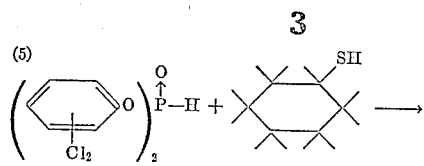

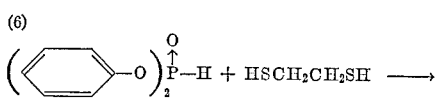

(6) 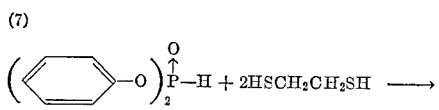

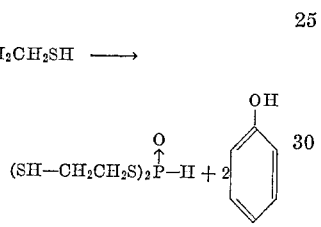

(7) 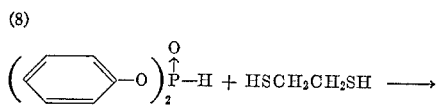

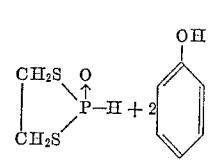

(8) 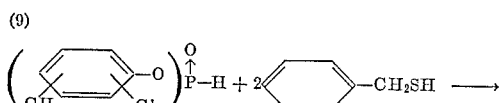

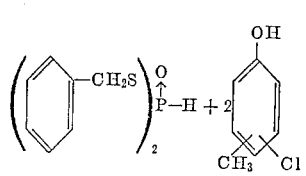

(9) 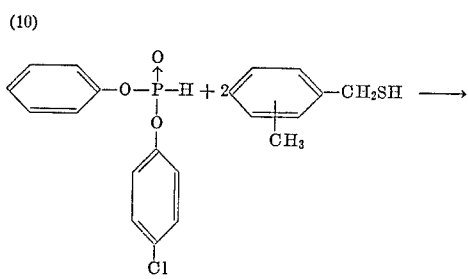

(10) 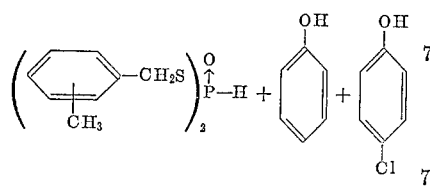

(11) 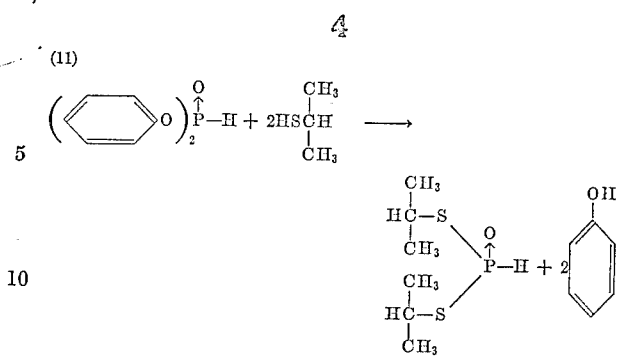

(12) 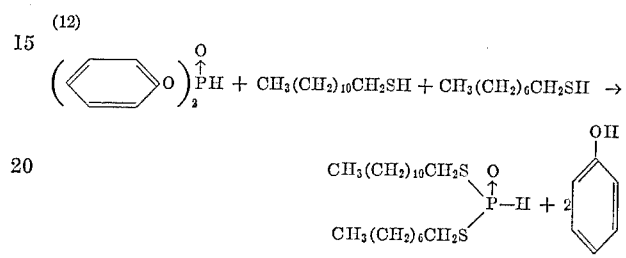

(13) 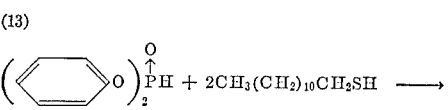

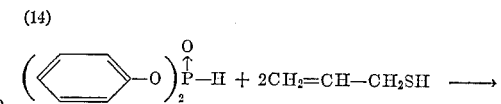

(14) 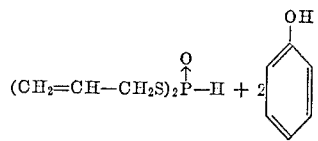

As indicated by the above equations, it is possible to replace one or two of the aryl radicals of the phosphite with one or more aliphatic radicals from the mercaptan. The molar ratio of aliphatic mercaptan to diarylhydrogenphosphite employed in the reaction may vary, depending upon the type of product desired. For example, if it is desired to obtain an arylalkylmonothiohydrogenphosphite from a diarylhydrogenphosphite and a monothiol, or an S,S-cyclicalkylenephosphonodithiolate from a diarylhydrogenphosphite and a dithiol, a molar ratio of the appropriate mercaptan to phosphite of at least about 0.8:1 and preferably at least about 1:1 is employed. Similarly, if it is desired to obtain a product predominating in dialkyldithiohydrogenphosphite from a mercaptan and a diarylphosphite, a molar ratio of mercaptan to phosphite of at least about 1.8:1, and preferably at least about 2:1 is employed. Generally, a stoichiometric excess of mercaptan up to about twenty percent is sufficient to effect the desired reaction, but greater proportions may be employed if desired.

The reaction is carried out at room temperature or below, or, if desired, the reaction mixture can be heated to remove either the phenolic product generated or the thiophosphite product, whichever has the lower boiling point. Thus, temperatures between about zero degrees centigrade and about one hundred and eighty degrees centigrade, and preferably between about seventy and about one hundred and fifty degrees centigrade may be employed.

Sub-atmospheric, atmospheric or super-atmospheric pressures may be employed, the most suitable pressure conditions depending on the nature of the reactants and the nature of the products formed. For example, if methyl mercaptan is reacted with diphenylhydrogenphosphite to form dimethyldithiohydrogenphosphite, the reaction is preferably carried out at super-atmospheric pressure. However, sub-atmospheric pressures are preferably employed when a high boiling aliphatic mercaptan such as lauryl mercaptan is employed as the mercaptan reactant.

The reaction time varies with the nature of the reactants, the temperature, the pressure, and the products desired. Completion of the reaction is generally effected in between about one-half and about twelve hours, but preferably between about one and about eight hours when lauryl mercaptan is reacted with diphenylhydrogenphosphite at a temperature of about one hundred degrees centigrade.

After the reaction is completed, or if desired, while the reaction progresses, the reaction mass is heated to distill off either the thiophosphite product or the phenolic product generated, whichever has the lower boiling point. If high boiling thiophosphites are recovered in the pot residue, the residue may be cooled to effect crystallization of impurities and then subjected to a solids-liquid separation step, such as filtration, to remove the solid impurities.

The following examples are presented to define the invention more fully without any intention of limiting the invention thereby. All parts and percentages are by weight unless otherwise specified.

*Example 1.—Dilauryldithiohydrogenphosphite*

About two moles of lauryl mercaptan (four hundred grams) and about 0.9 mole of diphenylhydrogenphosphite were admixed and heated in a distillation apparatus. Distillation was carried out at a pressure of between about fifteen and twenty-five millimeters of Hg. Phenol, which began to distill when the pot temperature reached one hundred and ten degrees centigrade, was collected until the pot temperature reached one hundred and fifty degrees centigrade. The phenol distillate weighed two hundred grams. The pot residue was then stripped of unreacted mercaptan by heating to one hundred and seventy degrees centigrade at a pressure of two hundred and fifty-three millimeters of Hg. About thirty grams of unreacted mercaptan were collected. The pot residue, after filtering, weighed three hundred and thirty grams, which is equivalent to a yield of dilauryldithiohydrogenphosphite of about sixty percent. Infrared analysis of the thiophosphite product showed the presence of only a small percentage of phenyl groups.

*Example 2.—S-Benzylphenylthiohydrogenphosphite*

One mole of diphenylhydrogenphosphite (two hundred and thirty-four grams), was added to a two-liter, round-bottom flask, equipped with a thermometer, a nitrogen ebullator, an adiabatic distillation column, twelve inches long by one-half inch in diameter, packed with one-eighth inch glass helices, which was fitted with a K distillation head, two condensers, a five-hundred milliliter cooled receiver which was connected to two Dry Ice traps, a manometer, and a mechanical vacuum pump. Two moles of benzyl mercaptan (248.4 grams), was reacted with one gram sodium hydride and when evolution of the hydrogen had ceased, this solution was added to the diphenyl phosphite. The pressure was reduced to fifteen millimeters Hg and the distillation begun. Two hundred and nineteen grams of distillate were collected which contained 4.2 grams of phenol. Pot temperatures varied between ninety-three degrees centigrade to one hundred and forty degrees centigrade and head temperatures between eighty-three and eighty-six degrees centigrade. An additional two moles of benzyl mercaptan was added and a similar distillation carried out which yielded two hundred and twenty-nine grams of distillate containing 19.5 grams phenol. Eight additional fifty gram portions of fresh benzyl mercaptan were added and distilled and each distillate contained from ten to twenty percent phenol. After the final distillation of this type, the packed column were removed and the last traces of excess benzyl mercaptan were removed at 0.5 to 1.0 millimeter Hg, pot temperature ninety to one hundred and forty-eight degrees centigrade, and vapor temperature eighty to one hundred degrees centigrade.

The distillation residue was allowed to cool, filtered, treated with two and one-half percent of Attapulgus clay and refiltered. Two hundred and five grams of clear orange product was recovered containing 13.4 percent sulfur (theory 12.2 percent). This amounted to 7 7.5 percent of theoretical yield.

*Example 3.—Dioctyl Dithiohydrogenphosphite*

In the same equipment used in Example 2, one mole of freshly prepared diphenylhydrogenphosphite (two hundred and thirty-four grams), was mixed with a solution of one gram sodium hydride in two moles n-octyl mercaptan (292.2 grams). A vacuum source was applied and the pressure reduced to thirteen millimeters Hg and heat was applied. The first distillation cut (one hundred and sixty-two grams), which was taken at a pot temperature of ninety-eight to one hundred and seven degrees centigrade and a head temperature of seventy-seven to eighty-two degrees centigrade at thirteen millimeters Hg contained 30.8 grams phenol. The pot contents were cooled and one hundred and thirty-five grams of fresh n-octyl mercaptan added. The second distillation cut was taken at essentially the same conditions and contained 22.8 grams phenol. An addition of one hundred and sixty grams mercaptan was made to the distillation pot and third cut (sixty-three grams), taken which contained 6.3 grams phenol. A fourth distillation cut of eighty-seven grams contained twelve grams phenol. Eleven additional fifty gram quantities of fresh n-octyl mercaptan were added and stripped off yielding an additional seventy-seven grams of phenol. At this point eighty-five percent of theoretical phenol had been removed. The distillation column was removed and the excess mercaptan distilled at one hundred and seventeen degrees centigrade pot temperature and fifty-five to sixty-one degrees centigrade head temperature at 0.35 millimeters Hg. The pot residue was treated with two percent Attapulgus clay and filtered. This filtrate separated into two layers, the upper layer being the product (two hundred and twenty-three grams) and the lower layer (twelve grams), being unreacted diphenylhydrogenphosphite and various decomposition products which formed on prolonged heating of diphenylhydrogenphosphite. Analysis of the upper product layer showed that it contained four percent phenol and less than three percent diphenylhydrogenphosphite as impurities. It contained 19.0 percent sulfur as compared with a theoretical value of 18.9 percent sulfur in dioctyl dithiohydrogenphosphite.

The catalyst should preferably be a strong enough base to have a pH of a least about eleven in an 0.1 normal solution.

It will be understood that various modifications within the invention are possible, some of which are referred to above. Therefore, I do not wish to be limited except as defined by the appended claims.

I claim:

1. A process for preparing a thiophosphite diester which comprises transesterifying at least one aryl radical of an aryl-substituted hydrogen phosphite selected from the group consisting of diarylhydrogenphosphite, arylalkylhydrogenphosphite, and O-arylalkylmonothiohydrogenphosphite, said aryl substituent being selected from the group consisting of phenyl, alkyl-substituted phenyl, halo-substituted phenyl, and mixtures thereof, with an organo mercaptan of 1 to 2 sulfhydryls in which said organo radical is selected from the group consisting of primary alkyl, secondary alkyl, alkenyl, phenyl-substituted alkyl, cyclohexyl, furfuryl, and mixtures thereof.

2. The process of claim 1 wherein transesterification is effected in the presence of a catalytic proportion of a basic inorganic catalyst.

3. A process for preparing an O-arylaliphaticmonothiohydrogenphosphite which comprises transesterifying a diphenylhydrogenphosphite wherein the phenyl radical may contain alkyl and halogen substituents with a mercaptan selected from the group consisting of alkyl, alkenyl, benzyl, cyclohexyl, and furfuryl mercaptans, in a proportion equivalent to at least about 0.8 mole of said mercaptan per mole of said phosphite.

4. The process of claim 3 wherein transesterification is effected in the presence of a catalytic proportion of an inorganic basic catalyst.

5. The process for preparing S-benzylphenylthiohydrogenphosphite which comprises transesterifying diphenylhydrogenphosphite with benzyl mercaptan in a proportion equivalent to at least about 0.8 mole of said mercaptan per mole of said phosphite.

6. The process for preparing a dialiphaticdithiohydrogenphosphite which comprises transesterifying a diphenylhydrogenphosphite wherein the phenyl radical may contain alkyl and halogen substituents with a mercaptan selected from the group consisting of alkyl, alkenyl, benzyl, cyclohexyl, and furfuryl mercaptans, in a proportion equivalent to at least about 1.8 moles of said mercaptan per mole of said phosphite.

7. The process for preparing phenylmonolaurylmonothiohydrogenphosphite which comprises transesterifying diphenylhydrogenphosphite with lauryl mercaptan in the molar ratio of at least about 0.8 mole of said mercaptan per mole of said phosphite.

8. The process for preparing dilauryldithiohydrogenphosphite which comprises transesterifying diphenylhydrogenphosphite with lauryl mercaptan in the molar ratio of at least about 1.8 moles of said mercaptan per mole of said phosphite.

9. The process of claim 8 wherein transesterification is effected in the presence of a catalytic proportion of an inorganic basic catalyst.

10. The process for preparing dioctyldithiohydrogenphosphite which comprises transesterifying diphenylhydrogenphosphite with octyl mercaptan in the molar ratio of at least about 1.8 moles of said mercaptan per mole of said phosphite, and transesterification being effected in the presence of a catalytic proportion of an inorganic basic catalyst.

11. The process for preparing a dialiphaticdithiohydrogenphosphite which comprises transesterifying an O-phenylaliphaticmonothiohydrogen phosphite wherein said phenyl radical may contain alkyl and halogen substituents with a mercaptan selected from the group consisting of primary alkyl, secondary alkyl, alkenyl, benzyl furfuryl, and cyclohexyl mercaptans, and mixtures thereof, in a proportion equivalent to at least about 0.8 mole of said mercaptan per mole of said phosphite.

12. The process of claim 11 wherein transesterification is effected in the presence of a catalytic proportion of an inorganic basic catalyst.

References Cited in the file of this patent

UNITED STATES PATENTS

| 2,353,558 | Gzemski | July 11, 1944 |
| 2,587,616 | Harman | Mar. 4, 1952 |

FOREIGN PATENTS

| 207,985 | Australia | May 8, 1957 |

OTHER REFERENCES

J. Am. Chem. Soc., vol. 79, page 5326, 1957.